United States Patent Office 3,447,918
Patented June 3, 1969

3,447,918
RUST INHIBITORS
James W. Amick, Highland, Ind., assignor to Standard Oil Company, Chicago, Ill., a corporation of Indiana
No Drawing. Filed Oct. 26, 1967, Ser. No. 678,170
Int. Cl. C10l 1/18; C09k 3/00
U.S. Cl. 44—70                    2 Claims

ABSTRACT OF THE DISCLOSURE

Rust inhibitors for distillate fuels comprising polybutene substituted succinic acid wherein the polybutene substituent has an average molecular weight in the range of 450 to 1100.

BACKGROUND OF THE INVENTION

This invention relates to a new class of rust inhibitors, and more particularly to substituted succinic acid rust inhibitors.

Distillate fuels, such as jet fuel, kerosine, heater oil, furnace oil, diesel fuel, etc., require rust inhibitors as corrosion protection for pipelines and the product distribution system in general as well as the protection of customer tanks and equipment. Due to the increased severity of use of distillate fuels under conditions providing high corrosion rates, more effective products are necessary as compared to the present commercial products. It has been found that the lower molecular weight substituted succinic acid or anhydride, or substituted succinic anhydrides do not provide the high degree of rust inhibition as is presently desirable. A possible explanation of the poorer performance of the anhydride is that the anhydride may react with polar groups present in the fuel in which it is to be used, e.g., amino groups. Carboxylic acids and carboxylic acid amine salts have also been used as rust inhibitors but have not been entirely satisfactory.

SUMMARY OF THE INVENTION

I have now found that the novel compositions of the present invention provide superior rust inhibition than was previously known with products of the prior art. It has been discovered that high molecular weight substituted succinic acid is a very effective rust inhibitor. It has also been found that the present inhibitors are more effective when used at low concentrations, and with other distillate fuel additives, than was previously known. There is also a substantial saving in cost with the use of the present additives.

Broadly, the compositions of the present invention comprise polybutene substituted succinic acids wherein the polybutene substituent has an average molecular weight of between about 450 and 1100. The most effective inhibitors are provided by the higher molecular weight polybutenes within this range. The products of the present invention specifically, may be produced by the reaction of a suitable polybutene with maleic anhydride and the resultant product hydrolyzed to the acid form. Particularly preferred polybutenes have an average molecular weight of between 700 and 900.

The products of the present invention may be prepared by reacting maleic anhydride with a suitable polybutene, and hydrolyzing the resulting product to form the acid.

DESCRIPTION OF PREFERRED EMBODIMENTS

The following examples are given by way of illustration, and the invention should not be construed as limited thereto.

Example I 175 grams of maleic anhydride (1.79 moles) was added to 1254 grams of polybutene having an average molecular weight of 850. The reactants were heated for about two hours at 392° F., and stirred overnight at 195–200° C. The temperature was raised to 225° C., and excess maleic anhydride was removed by blowing with nitrogen gas. The product was then filtered, and hydrolyzed to the diacid by heating to 220° F., and adding about 27 grams (1.5 moles) of water. The reactants were then stirred about one hour with reflux.

Example II

A product was obtained using the procedure of Example I except the polybutene was of 460 average molecular weight.

Example III

A product was obtained using the procedure of Example I except the polybutene was of 380 average molecular weight.

Example IV

A product was obtained using the procedure of Example I except the polybutene was of 250 molecular weight.

Examples V–VIII

In these examples the reactants of Examples I–IV were used to produce the products of Examples V–VIII respectively, except hydrolysis to form the acid was not done.

The products of the above examples were tested in furnace oils (identified below as fuel A, B or C) in the four-hour static rust test, which is as follows: a polished black iron strip is immersed in 100 mililiters of fuel in a 4-ounce tall-form bottle for 30 minutes. After 30 minutes, 10 mililiters of salt water (0.25% sodium chloride) is added. The bottle is stoppered and rolled on its side for 1 minute. The bottle is stood on end and is tapped 5 times to knock down excess water adhering to the metal. The strip is observed after 4 hours. Specks of rust in the oil phase are counted, and any rust spot larger than ⅛ inch in diameter is counted as 3 specks. The results of these tests are shown in the table.

TABLE

| Product of Example | Lbs./bbl. | Fuel | Other additives | Lbs./bbl. | Results, rust specks in oil phase (average) |
|---|---|---|---|---|---|
| Control | 0 | A | Antioxidant | 5 | 152 |
| Do | 0 | B | do | 2.5 | 71 |
| I | 2.5 | B | do | 2.5 | 0 |
| V | 2.7 | A | do | 5 | 131 |
| II | 2.5 | B | do | 2.5 | 0 |
| VII | 1.8 | A | do | 5 | 66 |
| Control | 0 | C |  | 0 | 74 |
| I | 1.5 | C |  | 0 | 2 |
| III | 1.5 | C |  | 0 | 22 |
| IV | 1.5 | C |  | 0 | 73 |
| I | 1.5 | C | Stabilizer [1] | 7 | 3 |
| II | 1.5 | C | do | 7 | 8 |
| III | 1.5 | C | do | 7 | 18 |
| IV | 1.5 | C | do | 7 | 46 |

[1] Antioxidant, dispersant and metal deactivator.

It may be seen from the above table that the products of this invention are very effective corrosion inhibitors, providing almost complete rust protection. The lower molecular weight products, and the anhydrides do not provide the protection afforded by the compounds of the instant invention.

What is claimed is:

1. A composition comprising: (a) a major amount of a distillate fuel; and (b) a minor amount of a rust inhibitor composition consisting essentially of a polybutene substituted succinic acid, said polybutene substituent having an average molecular weight in the range of 450 to 1100, said minor amount being sufficient to impart rust inhibition to said composition.

2. The composition of claim 1 wherein said polybutene substituent has an average molecular weight in the range of 700 to 900.

References Cited

UNITED STATES PATENTS

| 2,334,158 | 11/1943 | Von Fuchs et al. | 44—70 XR |
|---|---|---|---|
| 3,282,836 | 11/1966 | Miller et al. | 44—70 XR |

FOREIGN PATENTS

| 1,020,293 | 2/1966 | Great Britain. |
|---|---|---|

DANIEL E. WYMAN, *Primary Examiner.*

W. J. SHINE, *Assistant Examiner.*

U.S. Cl. X.R.

252—396